United States Patent [19]

Gennery

[11] Patent Number: 4,703,513

[45] Date of Patent: Oct. 27, 1987

[54] NEIGHBORHOOD COMPARISON OPERATOR

[75] Inventor: Donald B. Gennery, Glendale, Calif.

[73] Assignee: The United States of America as represented by the Administrator of the National Aeronautics and Space Administration, Washington, D.C.

[21] Appl. No.: 815,099

[22] Filed: Dec. 31, 1985

[51] Int. Cl.⁴ .............................................. G06K 9/46
[52] U.S. Cl. ........................................ 382/27; 382/49
[58] Field of Search ....................... 382/27, 41, 49, 54, 382/52; 358/280, 284, 282

[56] References Cited

U.S. PATENT DOCUMENTS

| | | | |
|---|---|---|---|
| 4,003,024 | 1/1977 | Riganati et al. | 340/146.3 |
| 4,389,677 | 6/1983 | Rushby et al. | 358/280 |
| 4,395,698 | 7/1983 | Sternberg et al. | 382/27 |
| 4,450,483 | 5/1984 | Coviello | 358/166 |
| 4,464,788 | 8/1984 | Sternberg et al. | 382/41 |
| 4,506,382 | 3/1985 | Hada et al. | 382/27 |
| 4,541,116 | 9/1985 | Lougheed | 382/49 |

Primary Examiner—Leo H. Boudreau
Assistant Examiner—Steven W. Brim
Attorney, Agent, or Firm—Paul F. McCaul; John R. Manning; Thomas H. Jones

[57] ABSTRACT

Digital values in a moving window are compared by an operator having nine comparators (18) connected to line buffers (16) for receiving a succession of central pixels together with eight neighborhood pixels. A single bit of program control determines whether the neighborhood pixels are to be compared with the central pixel or a threshold value. The central pixel is always compared with the threshold. The comparator output, plus 2 bits indicating odd-even pixel/line information about the central pixel, addresses a lookup table (20) to provide 14 bits of information, including 2 bits which control a selector (22) to pass either the central pixel value, the other 12 bits of table information, or the bit-wise logic OR of all neighboring pixels.

9 Claims, 6 Drawing Figures

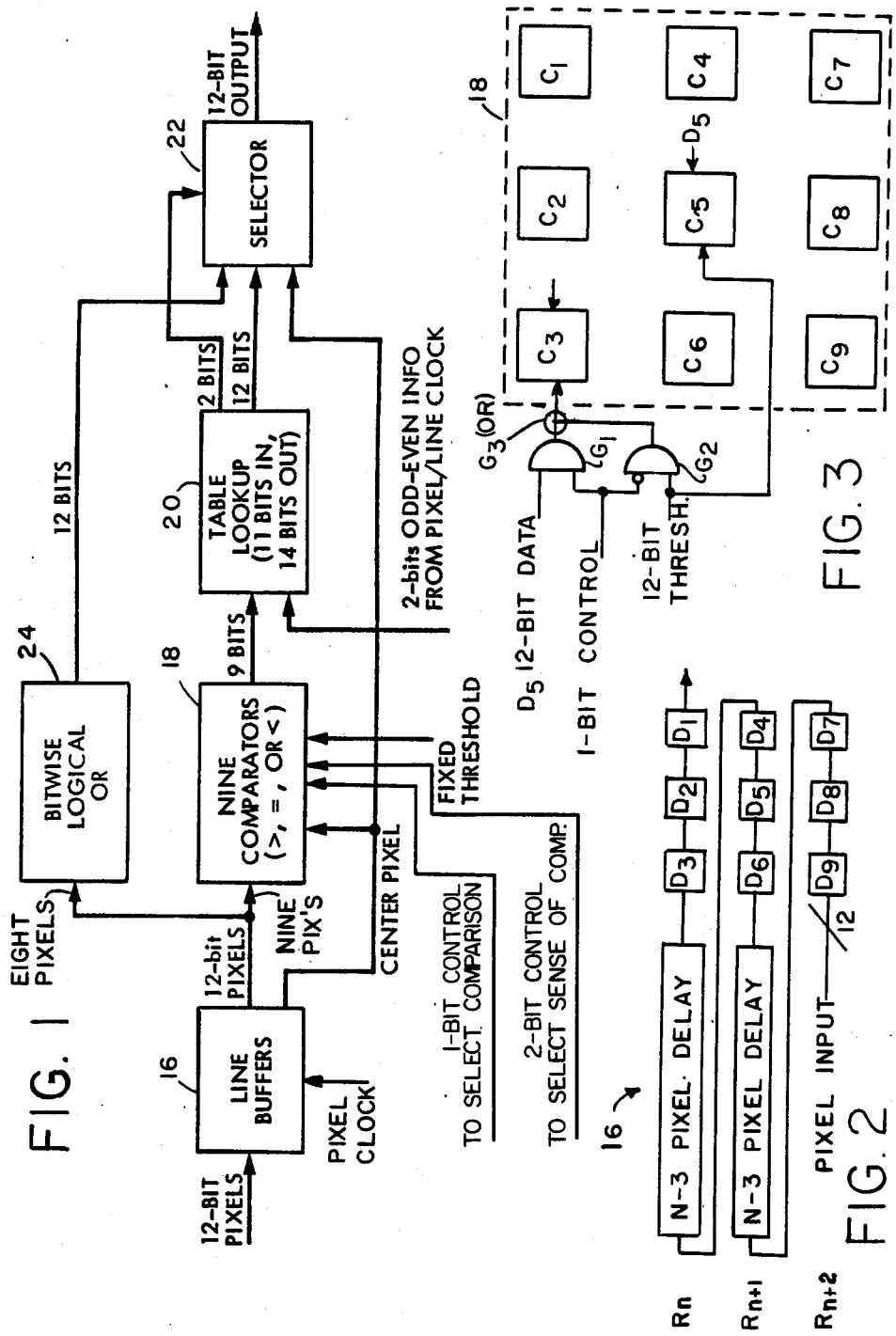

FIG. 4a

INPUT VALUES 0 0 1 1 0 = +6

1 1 0 0 1 = -7

COMPLEMENT SIGN BIT (1) 0 1 1 0 = (+) 6

(0) 1 0 0 1 = (-) 7
  ↑
  |___(+) 6 determined to be greater than (-) 7

FIG. 4b

INPUT VALUES 1 1 0 1 0 = -6

1 1 0 0 1 = -7

COMPLEMENT SIGN BITS (0) 1 0 1 0 = (-) 6

(0) 1 0 0 1 = (-) 7
    ↑
    |___ (-)6 determined to be greater than (-)7

FIG. 4c

INPUT VALUES 0 0 1 1 0 = +6

0 0 1 1 1 = +7

COMPLEMENT SIGN BITS (1) 0 1 1 0 = (+) 6

(1) 0 1 1 1 = (+) 7
        ↑
        |___(+)7 determined to be greater than (+)6

NEIGHBORHOOD COMPARISON OPERATOR

ORIGIN OF INVENTION

The invention described herein was made in the performance of work under a NASA contract, and is subject to the provisions of Public Law 96-517 (35 USC 202) in which the Contractor has elected not to retain title.

BACKGROUND OF THE INVENTION

This invention relates to real-time video data analysis, and more particularly to a pipelined neighborhood comparison operation for analysis of video pixels. This analysis may be used in a variety of ways to achieve dynamic data enhancement. See U.S. Pat. No. 4,464,788 for examples.

A pipelined processor for making comparisons between the values of a pixel and its adjacent pixels (neighbors) to find in the video image peaks, ridges, valleys, and the like, should be able to handle a data stream in real time. A limitation of such a processor is the need for conversion of the comparison results into arbitrary (programmed) information in under-microsecond cycle times, and a limitation of such a conversion implemented as a look-up table stored in memory is the cycle time of the memory.

SUMMARY OF THE INVENTION

In accordance with this invention, two consecutive scan lines are stored in line buffers for use in real time while a third is being received in order to have available a 3-by-3 array of pixels in a moving window, thus making available the nine pixel values for comparison of either the values of all pixels with a threshold value or the values of eight peripheral pixels with the center pixel and the center pixel with the threshold. One bit of program control makes the selection. Another two bits of program determine the sense of the comparison, i.e., greater than, equal, or less than. The outputs of the comparators form a 9-bit value. Two additional bits are appended to this 9-bit value to indicate the even or odd number of the raster scan line and to indicate the even or odd number of the pixel number on that line. The resulting 11-bit number is used to address a memory containing preprogrammed 14-bit information. Two bits of the 14-bit memory output determine which of the following three 12-bit values is selected as the output of the neighborhood comparison operator: the other 12 bits of the memory output; the value of the center pixel; or the bit-wise logical OR of the eight neighbors of the center pixel.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 1 is a functional block diagram illustrating the novel organization of a neighborhood comparison operator for a programmable pipelined vide image processor.

FIG. 2 illustrates schematically the arrangement for using two buffers for the purpose of making a succession of n-by-n array of pixels available to the neighborhood comparison operator every pixel period, where n is selected to be 3 as an example.

FIG. 3 is a schematic diagram illustrating a preferred implementation of a programmable set of nine comparators for comparing either a fixed constant or the value of the center pixel with each of the eight adjacent (neighborhood) pixels. The center pixel is always compared with the threshold.

FIGS. 4a, b and c illustrate comparison of valus expressed in two's complement form in a preferred embodiment.

DESCRIPTION OF PREFERRED EMBODIMENTS

Referring to FIG. 1, the functional block diagram of the neighborhood comparison operator is capable of being implemented entirely with conventional integrated logic circuits. The purpose of the operator is to compare each 12-bit pixel value received in a stream of video data that is raster scanned (one scan line at a time in sequence for a complete frame of 240, 480 or some other finite number of scan lines per frame) with either a fixed (but programmable) threshold value, or the value of the center pixel in the 3-by-3 moving window. This provides enhanced video image information that may be stored and/or displayed, such as peaks, ridges and valleys in the video data and used in performing such functions as growing and shrinking of pixel regions.

To create the 3-by-3 moving window, line buffers 16 store two consecutive scan lines $R_n$ and $R_{n+1}$ in line pixel delay element for comparison with a third raster $R_{n+2}$ (as shown in FIG. 2). Nine sets of pixel delay elements (D-type flip-flops) are connected in an array to store in succession three 12-bit outputs of the two buffers and three 12-bit inputs of the raster $R_{n+2}$, thus making available the nine 12-bit pixel values of the 3-by-3 window for nine digital comparators 18 shown in FIG. 3. In actuality, the first two rows of the 3-by-3 array of pixel delay element are effectively extensions of the line buffers and the third row is a 3-bit buffer for storing three 12-bit pixel values. The pixel values are all 12-bit parallel so that each pixel delay element identified in FIG. 2 by a letter D with a subscript for the window position is in actuality a set of 12 latches. During each pixel clock period, all nine 12-bit pixel values are thus available for comparison, with the center pixel shifting one pixel position in a raster with each pixel clock and the eight adjacent pixel values shifting with the center pixel value.

The eight peripheral comparators each have 24-bit inputs, 12 each for receiving the pixel values in parallel, and 12 each for receiving either a fixed threshold (programmable constant) or the value of the center pixel. The ninth comparator has 12 inputs for the center pixel value and 12 inputs for the threshold value. This organization is illustrated schematically in FIG. 3 where the nine comparators are labeled $C_1$ through $C_9$ and the programmed control for only the comparator $C_3$ is shown schematically as two 12-bit banks of AND gates $G_1$, $G_2$ and OR gates $G_3$ (represented in FIG. 3 as a junction). The 1-bit program control is connected to the bank of AND gates $G_2$ through an inverter represented by a small circle. When the 1-bit control is true (1), the 12-bit data is connected to the comparator $C_3$ via the bank of AND gates $G_1$, and when the 1-bit control is false (0), the 12-bit threshold value is gated through the bank of AND gates $G_2$. Each comparator has similar sets of 12 AND gates.

Each comparator may make a comparison for greater than, equal to, or less than ($>$, $=$, or $<$) the threshold value or central pixel value by subtraction (addition using two's complement arithmetic) of the pixel value and the threshold value or the central pixel value. This makes the sign bit of the result 0 when the input pixel is greater; 1 when the input pixel is less; and all bits of the result 0 when equal. But preferably the comparison is made one bit at a time by comparing corresponding successive bits starting with the most significant bit. The sign bits of the inputs are changed so that comparison for two's complement negative numbers is correct. FIG. 4a illustrates the algorithm for comparison of $00110 = +6$ and $11001 = -7$, using 5-bit signed two's complement numbers. Upon comparing bits one at a time starting with the most significant bit (MSB), the sign bit, it would appear that $-7$ is greater than $+6$, which is not correct. Therefore, before comparing, the sign bits of both numbers are inverted. This makes a positive number appear immediately as the greater whenever compared with a negative number. This is illustrated in FIG. 4. In other cases of comparing two positive or two negative numbers, inverting the sign bits will not make any difference. This is because the two sign bits will still be the same, and the determination of which is the greater number is then determined on the basis of the remaining bits, such as when comparing $00110 = 6$ or $11010 = -6$ with $0111 = 7$ or $11001 = -7$, respectively. This is illustrated in FIGS. 4b and c. In each example, the signs after inversion is indicated in parenthesis. Where bits compared are not alike, the number having a bit 1 in that position is determined to be greater, and the other less; if all bits compare to the least significant bit, it is determined they are equal. This avoids having to make a subtraction.

Although only three comparisons are actually indicated by a comparator output, namely "less than," "greater than" and "equal to," inverting the sense of the look-up table, i.e., complementing the table addresses before storing the desired look-up table, in effect changes these to "equal to or greater than," "not equal to or less than," and "not equal to."

The outputs of the nine comparators form a 9-bit value. Another two bits are appended to this 9-bit value as determined from odd even information from counting pixels in a line and counting lines in a frame. Conventional means (not shown) provide the 2-bits of odd-even information as well as the pixel clock for the line buffers. The 1-bit program control for the comparators and a fixed threshold for the comparators are provided by a host computer (not shown). The 2-bit odd-even information indicates whether the central pixel of the moving window is in an even or an odd raster in a frame, and whether the central pixel is even or odd in the raster.

The resulting 11-bit number is used to address a look-up table 20 stored in a random access memory (RAM). A selector 22 responds to 2 bits of each 14-bit output of the memory to select which of three sources of 12-bit values are to become the output of the neighborhood comparison operator: the other 12-bits of output from the look-up table 20; the center pixel value of the window; or the bit-wise logical OR of the eight neighbors of the central pixel from a circuit 24 that effectively implements a very wide (8×12) OR gate.

The other twelve bits would be used in cases where the detection of some particular condition is to be indicated (such as a peak or edge, for example). In some cases, only one bit is needed (to indicate merely the presence or absence of a feature). However, in other cases more bits can be used in order to indicate additional information (such as the direction of an edge, for example).

The center pixel would be used when the information in the input data to the operator is desired in the output at points where the particular condition is detected. For example, the input may contain gradient intensity, and the operator could detect the peaks of this and set other points to zero by using the 12-bit output, but at the peaks the center pixel indicates the intensity and would be used for output.

The logical OR would be used for region growing. In the most common such cases, a nonzero region would grow by one pixel per stage into a zero region. However, more complicated cases might exist. For example, different portions of the twelve bits might represent different fields, each of which has nonzero regions growing into zero regions, and since the logical OR is formed bitwise, it automatically selects the nonzero region when it becomes adjacent to a given pixel. In some cases, the values in the region may be changing as it grows, perhaps to indicate distance from the start. If the region must flow around obstacles, when the nonzero region meets itself after flowing around an obstacle in two different directions, the values may differ by one. If Gray code is used for the distance count instead of ordinary binary, only one bit will differ, and thus the bitwise logical OR produces one of these numbers, and not some widely different value.

The inclusion of the two-dimensional odd-even information about the pixel position is for the purpose of implementing subfields. These two bits appended to the 9-bit comparison output allow the definition of four subfields (odd scan line, odd pixel; odd scan line, even pixel; even raster, odd pixel; and even raster, even pixel), with different operations made possible on each. This feature allows a convenient way of insuring that a connected region (in binary form) is not disconnected when it is desired to thin it to the width of one pixel.

Although particular embodiments of the invention have been described and illustrated herein, it is recognized that modifications and variations may readily occur to those skilled in the art. Consequently, it is intended that the claims be interpreted to cover such modifications and variations.

What is claimed is:

1. In a neighborhood comparison operator for comparing the digital value of a center pixel of a 3×3 moving window with a threshold value and the values of eight neighbor pixels with the threshold value or the value of the center pixel, said operator having means for storing nine pixel values of a moving 3×3 window of a stream of pixel values in digital form, and having nine comparators, one for each pixel value of the 3×3 window, each adapted to receive said threshold value for comparison, and in the case of the eight neighborhood pixel comparators further adapted to receive the value of said center pixel, and means for selecting for comparison in said eight neighborhood pixel comparators either said threshold for the central pixel value, control means for selecting the sense of comparison from the choice of either greater than, equal to, or less than, an improvement comprising means for appending two bits to the output of said comparators, one bit indicating whether the center pixel is odd or even when counted in sequence for each scan line, and the other indicating whether the scan line is odd or even for each frame, and a memory containing preprogrammed information in a table addressed by the result of comparison and said two appended bits.

2. A neighborhood comparison operator as defined in claim 1 including means for forming the bit-wise logical OR of the eight neighboring input pixel values, where the information obtained from said memory for each address is comprised of data bits plus two additional bits, and further including means responsive to said two additional bits for selecting as the neighborhood comparison operator output either the memory output, the value of the center pixel, or the bit-wise logical OR, whereby the output of the neighborhood comparison operator may be programmed as a function of the comparison and said two bits.

3. A neighborhood comparison operator as defined in claim 1 wherein negative numbers are represented by the two's complement of the absolute value in binary form, and comparison of binary numbers is performed by comparing corresponding bits commencing with the sign bit and progressing from the most significant bit position to the least significant bit position, and means for complementing the sign bits before comparing.

4. In a real-time data processor having a memory containing preprogrammed information in a table, a method for comparing the digital value of a center pixel of a 3×3 moving window with a threshold value and the values of eight neighbor pixels with either the threshold value or the value of the center pixel, comprising the steps of storing nine pixel values of a moving 3×3 window of a stream of pixel values in digital form, for each pixel value of the 3×3 window, providing for comparison with said threshold value, and in the case of the eight neighborhood pixel comparators, providing for comparison with the value of said center pixel, and selecting whether to compare neighborhood pixel values with the threshold or the central pixel value, including selecting the sense of comparison from the choice of either greater than, equal to, or less than, appending two bits to the comparison result, one bit indicating whether the center pixel is odd or even when counted in sequence for each scan line, and the other indicating whether the scan line is odd or even for each frame, and addressing said memory containing preprogrammed information in a table by the result of the selected comparison and two appended bits.

5. A method as defined in claim 4 including the step of forming bit-wise logical OR of the neighboring input pixel values to said comparators.

6. A method as defined in claim 5 where the information obtained from said memory for each address is comprised of data bits plus two additional bits, and including the step of selecting as the process output either the memory output, the value of the center pixel, or the bit-wise logical OR, whereby the output of the process may be programmed as a function of the comparison and the odd-even bits.

7. A method as defined in claim 4 wherein negative numbers are represented by the two's complement of the absolute value in binary form, and comparison of binary numbers is performed by comparing corresponding bits commencing with the sign bit and progressing from the most significant bit position to the least significant bit position, and complementing the sign bits before comparing.

8. In a neighborhood comparison operator, wherein nine comparators connected to line buffers for receiving a succession of central pixels together with neighboring pixels, and to receive a threshold value, the combination comprising means for determining whether the neighborhood pixels are to be compared with the center pixel or said threshold value while the central pixel is always compared with the threshold value, means for appending to the output of said comparators two bits indicating odd-even pixel/line information about the central pixel, a lookup table, and means for addressing said lookup table to provide information in digital form, including two bits which select to pass either the central pixel value, the remaining bits of table information, or the bit-wise logical OR of neighboring pixels as the output of the neighborhood comparison operator.

9. A method for real-time video data analysis in a neighborhood comparison operator comprising the steps of storing two consecutive scan lines for analysis in real time with a third line being received, thereby having available a 3-by-3 array of pixels in a moving window, thus making available nine pixel values for comparison, selecting for comparison the values of all pixels with a threshold value, or the values of eight neighboring pixels with the center pixel or selecting for comparison the center pixel with the threshold value, and determining the sense of the comparison from a choice of greater than, equal to, or less than the threshold or center pixel, forming the bit-wise logical OR of the eight neighboring input pixel values, appending two additional bits to the resulting value of each comparison to indicate the even or odd number of the raster scan line and to indicate the even or odd number of the pixel number on that line, and using the resulting number to address a memory containing preprogrammed information, and thereafter using two bits of the memory output to determine which of three values is selected as the output of the neighborhood comparison operator, namely the remaining bits of the memory output; the value of the center pixel; or the bit-wise logical OR of the eight neighboring pixel values.

* * * * *